United States Patent

Monzaki et al.

[11] Patent Number: 5,839,798
[45] Date of Patent: Nov. 24, 1998

[54] SPIN SUPPRESS CONTROL DEVICE OR VEHICLE DISTINCTIVE OF DEGREE OF EMERGENCY THEREOF

[75] Inventors: Shirou Monzaki, Mishima; Shoji Inagaki, Numazu; Akio Okada; Hiroshi Kawaguchi, both of Mishima, all of Japan

[73] Assignee: Toyota Jidosha Kabushiki Kaisha, Toyota, Japan

[21] Appl. No.: 680,044

[22] Filed: Jul. 15, 1996

[30] Foreign Application Priority Data

Aug. 8, 1995 [JP] Japan .................................. 7-222586
Oct. 2, 1995 [JP] Japan .................................. 7-278339

[51] Int. Cl.⁶ ......................................................... B60T 8/32
[52] U.S. Cl. .............................................. 303/146; 701/72
[58] Field of Search .................................... 303/146, 147, 303/186, 187, 188; 364/426.016, 426.027; 701/72

[56] References Cited

U.S. PATENT DOCUMENTS

| | | | |
|---|---|---|---|
| 5,229,944 | 7/1993 | Yasuno | 303/146 |
| 5,328,256 | 7/1994 | Ohta et al. | 303/146 |
| 5,341,297 | 8/1994 | Zomotor et al. | 303/146 |
| 5,480,219 | 1/1996 | Kost et al. | 303/146 |

FOREIGN PATENT DOCUMENTS

| | | |
|---|---|---|
| 41 23 235 | 11/1992 | Germany . |
| A-6-24304 | 2/1994 | Japan . |
| A-6-99800 | 4/1994 | Japan . |

*Primary Examiner*—Lee W. Young
*Attorney, Agent, or Firm*—Oliff & Berridge, PLC

[57] ABSTRACT

A spin suppress control device of a vehicle makes a first spin state estimation of the vehicle body and a second spin state estimation of the vehicle body in close time proximity to the first spin state estimation, and applies a braking force to one of the front left and right wheels at the outside of the turn such that a first braking force is applied according to the first spin state estimation and a second braking force is applied according to the second spin state estimation to be at least either stronger than the first braking force or with a greater advancement relative to an actual spin state of the vehicle than the first braking force. The second spin state estimation may be executed by a reversal of yaw rate of the vehicle body across its neutral, or by a spin state above a predetermined level occurring before a predetermined time lapses from the end of the spin suppress control according to the first spin state estimation, or by a spin state estimating parameter being modified to incorporate a time-based differential thereof.

5 Claims, 9 Drawing Sheets

SPIN SUPPRESS CONTROL DEVICE OR VEHICLE DISTINCTIVE OF DEGREE OF EMERGENCY THEREOF

BACKGROUND OF THE INVENTION

1. Field of the Invention

The present invention relates generally to a behavior control of a vehicle such as an automobile for improving the running stability thereof, and more particularly, to a spin suppress control device for more desirably suppressing the vehicle from spinning with distinction of the degree of emergency thereof.

2. Description of the Prior Art

It is well known that the automobiles and the like vehicles are, when unduly steered, liable to a "spin", because the side force applied to the vehicle body as a centrifugal force can increase with no limit along with increase of vehicle speed and steering angle, while the tire grip force for holding the vehicle body from the road surface against the side force is limited, particularly to be less on a slippery wet road.

Various endeavors have been made to suppress the automobiles and the like vehicles from spinning. There are those described in Japanese Patent Laid-open Publications 6-24304 and 6-99800, for example.

In similar endeavors for further improving the vehicle behavior against spinning, the present inventors have noted that the drivers must sometimes abruptly turn the steering wheel in trying to avoid an unexpected obstacle, or continually turn the steering wheel alternately in opposite directions to follow a snaked road. To meet with such a severe steering condition, it would be desired that a spin suppress control is executed at a high responsiveness, such as to apply a braking force to a front left or a front right wheel at the outside of the turn, so as to generate an anti-spin moment in the vehicle body, at a high rate in accordance with a parameter or parameters for estimating the probability of a spinning. However, if the gain of such a spin suppress control is increased in order to obtain a higher responsiveness of the control, the control will pickup a noise such as an error in the detection or estimation of a parameter or parameters such as the slip angle $\beta$ of the vehicle body, etc., and thereby an instability of the spin suppress control will be caused.

SUMMARY OF THE INVENTION

In view of the above inconvenience, it is a principal object of the present invention to provide a more improved spin suppress control device of a vehicle such as an automobile which can more effectively suppress the vehicle from spinning at high responsiveness of the control, while avoiding that unnecessary spin suppress controls are executed by noises due to the high responsiveness of the control.

According to the present invention, the above-mentioned object is accomplished by a spin suppress control device of a vehicle having a vehicle body, front left and right wheels, and a steering means for steering the front left and right wheels, comprising a means for making a first spin state estimation of the vehicle body and a second spin state estimation of the vehicle body in close time proximity to said first spin state estimation, a brake means for applying a variable braking force to each of the front left and right wheels, and a means for controlling said brake means to apply a braking force to one of the front left and right wheels at the outside of the turn, wherein said brake control means controls said brake means so as to apply a first braking force to the front wheel at the outside of the turn according to said first spin state estimation and a second braking force to the front wheel at the outside of the turn according to said second spin state estimation such that said second braking force is at least either stronger than said first braking force or applied with a greater advancement relative to an actual spin state of the vehicle than said first braking force.

By the spin suppress control device being so constructed that the spin state of the vehicle body is estimated as a first spin state estimation and a second spin state estimation in close time proximity to said first spin state estimation, and the braking force is applied to the front wheel at the outside of the turn according to said first and second spin state estimations such that said second braking force according to said second spin state estimation is either stronger than said first braking force according to said first spin state estimation or applied with a greater advancement relative to an actual spin state of the vehicle than said first braking force, the spin suppress control can be automatically adapted to the emergency of the spin suppress control, so as to be able to meet with a reversal of steering such that the steering wheel is turned in one direction and then continually turned in the opposite direction over the neutral, or a successive steering such that a first steering is immediately followed by a second steering.

According to more detailed features of the present invention, said second spin state estimation may be executed by a reversal of yaw rate of the vehicle body across neutral thereof; by a spin state above a predetermined level occurring before a predetermined time lapses from the end of the spin suppress control according to said first spin state estimation; or by a spin state estimation parameter being modified to incorporate a differential thereof.

According to a still further detailed feature of the present invention, said brake means may include a wheel cylinder and a hydraulic system for supplying brake fluid to said wheel cylinder, and said second braking force may be made stronger than said first braking force by the duty ratio for supplying brake fluid to said wheel cylinder is limited by a higher limit value for said second braking force than for said first braking force.

According to a still further detailed feature of the present invention, said brake control means may have an insensible region in the control of the brake means according to said first and second spin state estimations, said insensible region being smaller for said second spin state estimation than for said first spin state estimation.

BRIEF DESCRIPTIONS OF THE DRAWING

In the accompanying drawing.

DESCRIPTION OF THE EMBODIMENTS

In the following, the present invention will be described in more detail in the form of some preferred embodiments with reference to the accompanying drawings.

Figure 1:
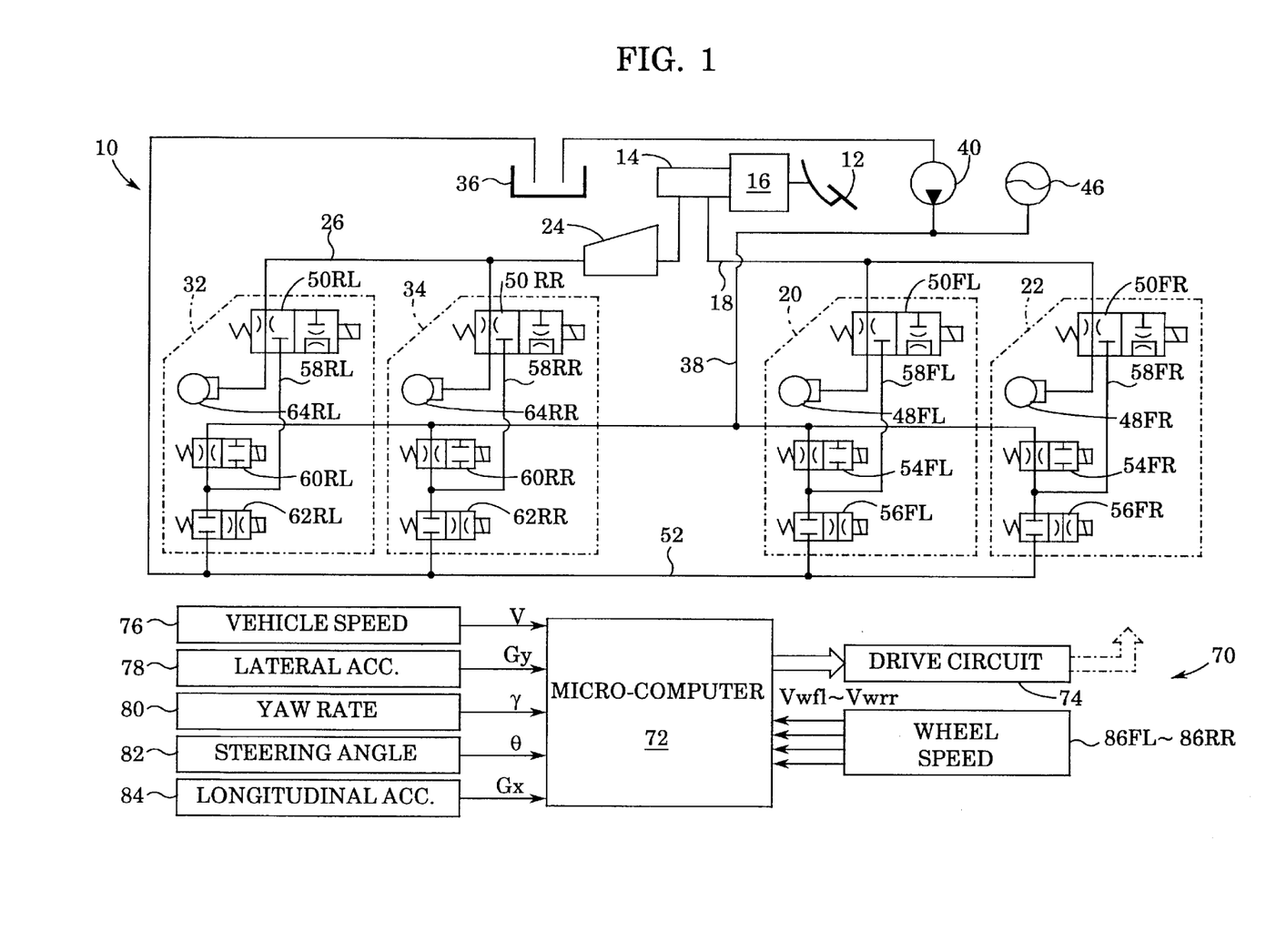
FIG. 1 is a diagrammatic illustration of hydraulic circuit means and electrical control means of an embodiment of the spin suppress control device according to the present invention.

First, referring to FIG. 1 showing diagrammatically an embodiment of the spin suppress control device of the present invention with regard to the constructions of its hydraulic circuit means and its electric control means, the hydraulic circuit means generally designated by 10 comprises a conventional foot brake pressure source means including a brake pedal 12 to be stepped on by a driver, a master cylinder 14 adapted to generate a foot brake pressure according to the stepping-on of the brake pedal 12, and a hydro-booster 16. A first passage 18 extends from a first port of the master cylinder 14 to a front left wheel brake pressure control means 20 and a front right wheel brake pressure control means 22. A second passage 26 including a proportioning valve 24 in its way extends from a second port of the master cylinder 14 to a rear left wheel brake pressure control means 32 and a rear right wheel brake pressure control means 34.

The hydraulic circuit means 10 further comprises a powered brake pressure source means including a reservoir 36 and a brake fluid pump 40 which delivers a pressurized brake fluid to a high pressure passage 38 to which an accumulator 46 is connected.

The brake pressure control means 20 and 22 of the front left and front right wheels include wheel cylinders 48FL and 48FR for applying braking force to the front left and front right wheels, 3-ports-2-positions changeover type electromagnetic control valves 50FL and 50FR, and series connections of normally open type electromagnetic on-off valves 54FL and 54FR and normally closed type electromagnetic on-off valves 56FL and 56FR, respectively, said series connections of the normally open type on-off valves and the normally closed type on-off valves being connected between the high pressure passage 38 and a return passage 52 connected to the reservoir 36. A mid point of the series connection of the on-off valves 54FL and 56FL is connected to the control valve 50FL by a connection passage 58FL, and a mid point of the series connection of the on-off valves 54FR and 56FR is connected to the control valve 50FR by a connection passage 58FR.

The brake pressure control means 32 and 34 of the rear left and rear right wheels include wheel cylinders 64RL and 64RR for applying braking force to the rear left and rear right wheels, 3-ports-2-positions changeover type electromagnetic control valves 50RL and 50RR, and series connections of normally open type electromagnetic on-off valves 60RL and 60RR and normally closed type electromagnetic on-off valves 62RL and 62RR, respectively, said series connections of the normally open type on-off valves and the normally closed type on-off valves being connected between the high pressure passage 38 and the return passage 52 connected to the reservoir 36. A mid point of the series connection of the on-off valves 60RL and 62RL is connected to the control valve 50RL by a connection passage 58RL, and a mid point of the series connection of the on-off valves 60RR and 62RR is connected to the control valve 50RR by a connection passage 58RR.

The control valves 50FL and 50FR are respectively switched over between a first position for connecting the wheel cylinders 48FL and 48FR with the passage 18, while disconnecting the wheel cylinders 48FL and 48FR from the connection passages 58FL and 58FR, respectively, as in the state shown in the figure, and a second position for disconnecting the wheel cylinders 48FL and 48FR from the passage 18, while connecting the wheel cylinders 48FL and 48FR with the connection passages 58FL and 58FR, respectively.

The control valves 50RL and 50RR are respectively switched over between a first position for connecting the wheel cylinders 64RL and 64RR with the passage 26, while disconnecting the wheel cylinders 64RL and 64RR from the connection passages 58RL and 58RR, respectively, as in the state shown in the figure, and a second position for disconnecting the wheel cylinders 64RL and 64RR from the passage 26, while connecting the wheel cylinders 64RL and 64RR with the connection passages 58RL and 58RR, respectively.

When the control valves 50FL, 50FR, 50RL, 50RR are in the first position as in the state shown in the figure, the wheel cylinders 48FL, 48FR, 64RL, 64RR are connected with the passages 18 and 26 so as to supply the pressure of the master cylinder 14 to the respective wheel cylinders, thereby enabling the driver to apply a braking force to each wheel according to the stepping-on of the brake pedal 12, whereas when the control valves 50FL, 50FR, 50RL, 50RR are at the second position, the wheel cylinders are isolated from the master cylinder, the wheel cylinders 48FL, 48FR, 64RL, 64RR are supplied with the powered brake pressure under the control of the normally open on-off valves 54FL, 54FR, 60RL, 60RR and the normally closed on-off valves 56FL, 56FR, 62RL, 62RR according to the ratio of the open state of the corresponding normally open valve and the closed state of the corresponding normally closed valve, i.e. the so-called duty ratio, regardless of the stepping-on of the brake pedal 12.

The control valves 50FL, 50FR, 50RL, 50RR, normally open on-off valves 54FL, 54FR, 60RL, 60RR, normally closed on-off valves 56FL, 56FR, 62RL, 62RR and the pump 40 are all controlled by an electric control means 70 as described in detail hereinbelow. The electric control means 70 consists of a micro-computer 72 and a driving circuit means 74. Although not shown in detail in FIG. 1, the micro-computer 72 may have a general construction including a central processing unit, a read only memory, a random access memory, input and output port means and a common bus interconnecting these functional elements.

The input port means of the micro-computer 72 is supplied with a signal showing vehicle speed V from a vehicle speed sensor 76, a signal showing lateral acceleration Gy of the vehicle body from a lateral acceleration sensor 78 mounted substantially at a mass center of the vehicle body, a signal showing yaw rate γ of the vehicle body from a yaw rate sensor 80, a signal showing steering angle θ from a steering angle sensor 82, a signal showing longitudinal acceleration Gx of the vehicle body from a longitudinal acceleration sensor 84 mounted substantially at the mass center of the vehicle body, and signals showing wheel speed (wheel circumferential speed) Vwfl, Vwfr, Vwrl, Vwrr of front left and front right wheels and rear left and rear right wheels from wheel speed sensors 86FL–86RR, respectively. The lateral acceleration sensor 78, the yaw rate sensor 80 and the steering angle sensor 82 detect the lateral acceleration, yaw rate and steering angle, respectively, to be positive when the vehicle makes a left turn, and the longitudinal acceleration sensor 84 detects longitudinal acceleration to be positive when the vehicle is accelerated in the forward direction. In general, in the following analyses, the parameters which are distinctive of the direction of turn of the vehicle are each assumed to be positive when the turn is anti-clockwise and negative when the turn is clockwise, as viewed from the top of the vehicle.

The read only memory of the micro-computer 72 stores such flowcharts as shown in FIGS. 2, 3, 7–9 and such maps as shown in FIGS. 4–6, 10–11. The central processing unit conducts various calculations based upon the parameters detected by the above-mentioned various sensors according to those flowcharts and maps as described hereinbelow, so as to obtain a spin quantity for judging and estimating the spin state of the vehicle, and controls the turn behavior of the vehicle based upon the estimated conditions, particularly to suppress the vehicle from spinning, by applying a braking force to the front wheel at the outside of the turn.

Figure 2:
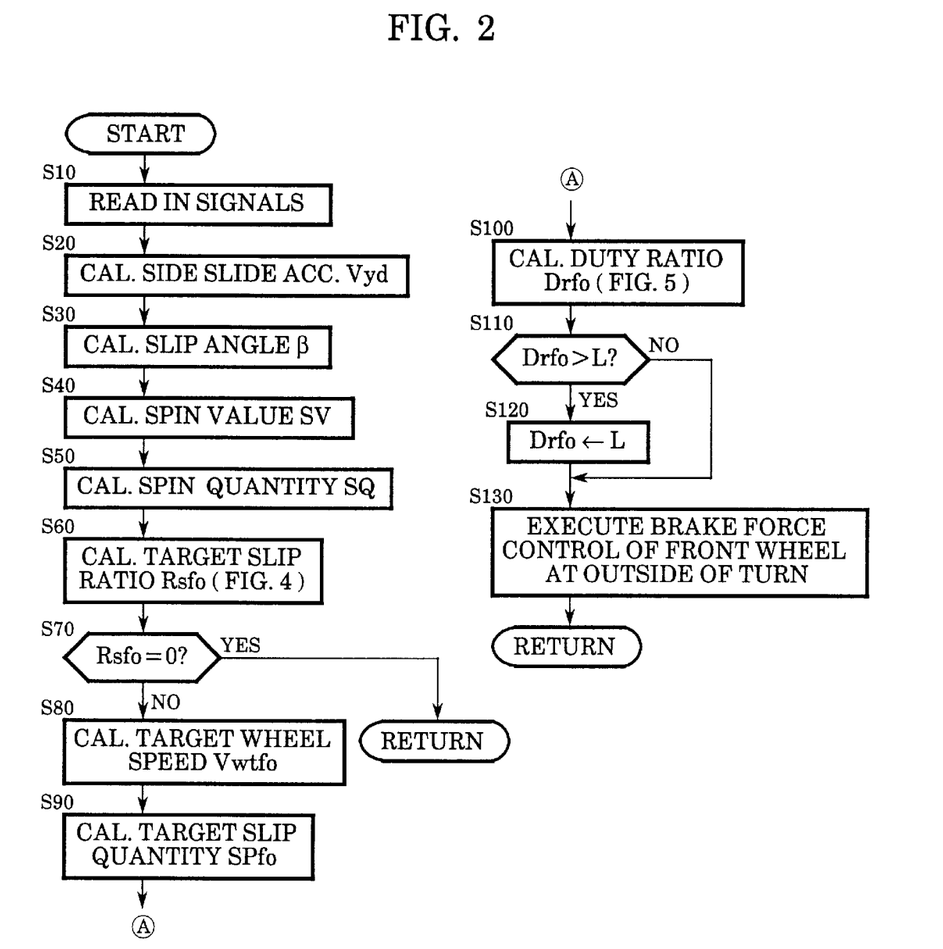
FIG. 2 is a flowchart showing a first embodiment of the spin suppress control routine according to the present invention.

In the following, a first embodiment of the spin suppress control routine will be described with reference to FIG. 2. The control according to the flowchart shown in FIG. 2 is started by a closure of an ignition switch not shown in the figure and carried out repetitively at a predetermined time interval.

In step 10, the signals including the vehicle speed V from the vehicle speed sensor 76 and others are read in. In step 20, side slide acceleration of the vehicle body is calculated from the lateral acceleration Gy, vehicle speed V and yaw rate γ as Vyd=Gy−V*γ. In step 30, the side slide acceleration Vyd thus obtained is integrated to obtain side slide velocity of the vehicle body as Vy, and then slip angle of the vehicle body is calculated as a ratio of the side slide velocity Vy to the longitudinal velocity Vx of the vehicle body (=vehicle speed V), as β=Vy/Vx.

In step 40, taking two positive constants K1 and K2, a spin value SV is calculated as a linear sum of the slip angle β and the side slide acceleration Vyd, such as SV=K1*β+ K2*Vyd. In step 50, the direction of turn of the vehicle is judged from the sign of the yaw rate γ, and a spin quantity SQ is determined to be equal to SV when the spin value SV is positive, and to be equal to −SV when the spin value SV is negative. Or, alternatively, the spin quantity may be determined to be more sensitive about the variety of turn behavior of the vehicle such that, when the spin value SV is positive in conformity with the yaw rate γ being positive, the spin quantity SQ is equal to SV but if the spin value SV is negative against the positive yaw rate γ, the spin quantity SQ is made zero, and similarly, when the spin value SV is negative in conformity with the yaw rate γ being negative, the spin quantity SQ is equal to −SV but if the spin value SV is positive against the negative yaw rate γ, the spin quantity SQ is made zero.

Figure 4:
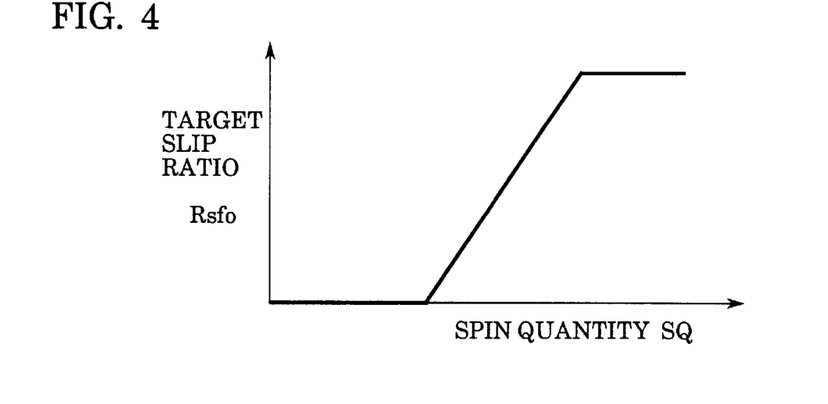
FIG. 4 is a graph showing the relationship between the spin quantity SQ and the target slip ratio Rsfo.

In step 60, based upon the spin quantity SQ and according to a map such as shown in FIG. 4, a target slip ratio Rsfo for the front wheel at the outside of the turn is calculated. Alternatively, the spin value SV may be calculated as a linear sum of the slip angle β and its differential β d.

In step 70, it is judged if the target slip ratio Rsfo is 0, i.e. if the vehicle is making a stable turn with no need of the spin suppress control. If the answer is yes, then the control returns to step 10, whereas if the answer is no, then the control proceeds to step 80.

In step 80, denoting a standard wheel speed (for example, the wheel speed of the front wheel at the inside of the turn) as Vb, a target wheel speed Vwtfo for the front wheel at the outside of the turn is calculated as follows:

*Vwtfo=Vb\*(100−Rsfo)/100*

In step 90, denoting wheel speed of the front wheel at the outside of the turn as Vwfo, wheel acceleration (differential of Vwfo) of the front wheel at the outside of the turn as Vwfod, and a positive constant as Ks, a slip quantity SPfo for the front wheel at the outside of the turn is calculated as follows:

*SPfo=Vwfo−Vwtfo+Ks\*(Vwfod−Gx)*

Figure 5:
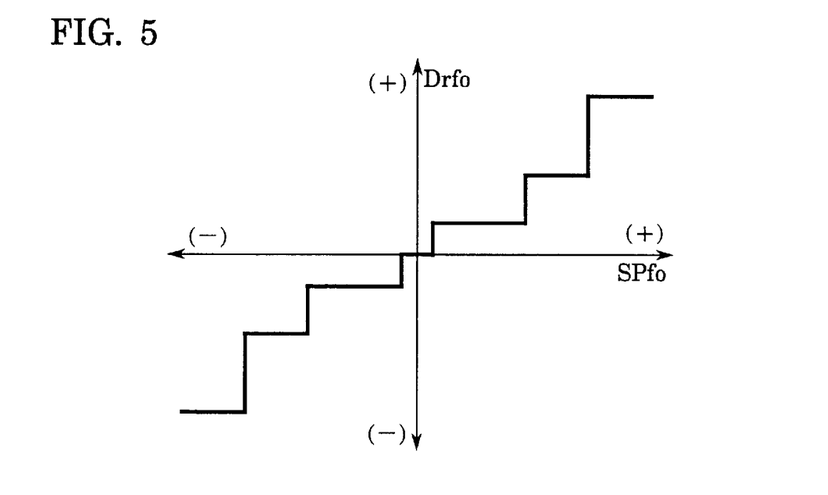
FIG. 5 is a graph showing the relationship between the slip quantity SPfo and the duty ratio Drfo.

In step 100, according to a map such as shown in FIG. 5, duty ratio Drfo for controlling the series combination of the normally open on-off valve 54FL or 54FR and the normally closed on-off valve 56FL or 56FR of the front wheel at the outside of the turn is calculated. In the map of FIG. 5, the positive values of the duty ratio increase the brake pressure supplied to the wheel cylinder 48FL or 48FR, while the negative values of the duty ratio decrease the brake pressure supplied to the wheel cylinder 48FL or 48FR.

In steps 110 and 120, the duty ratio Drfo is limited not to exceed a limit value L which is determined as described hereinbelow.

In step 130, control signals are output toward the control valve 50FL or 50FR corresponding to the front wheel at the outside of the turn, so that the control valve 50FL or 50FR is changed over to the second positions thereof, and also toward the on-off valves 54FL and 56FL or 54FR and 56FR of the front wheel at the outside of the turn, so that the powered brake pressure is supplied to the wheel cylinder 48FL or 48FR of the front wheel at the outside of the turn according to the duty ratio Drfo.

Now, it will be appreciated that if the duty ratio Drfo is greater, the powered brake pressure is supplied to the wheel cylinder 48FL or 48FR of the front wheel at the outside of the turn at a higher rate, i.e. more quickly, so that the spin control by braking the front wheel at the outside of the turn is made at a higher sensitivity. Therefore, a variable adjustment of the sensitivity of the spin suppress control is available by a corresponding variable adjustment of the maximum value of the duty ratio Drfo.

Figure 3:
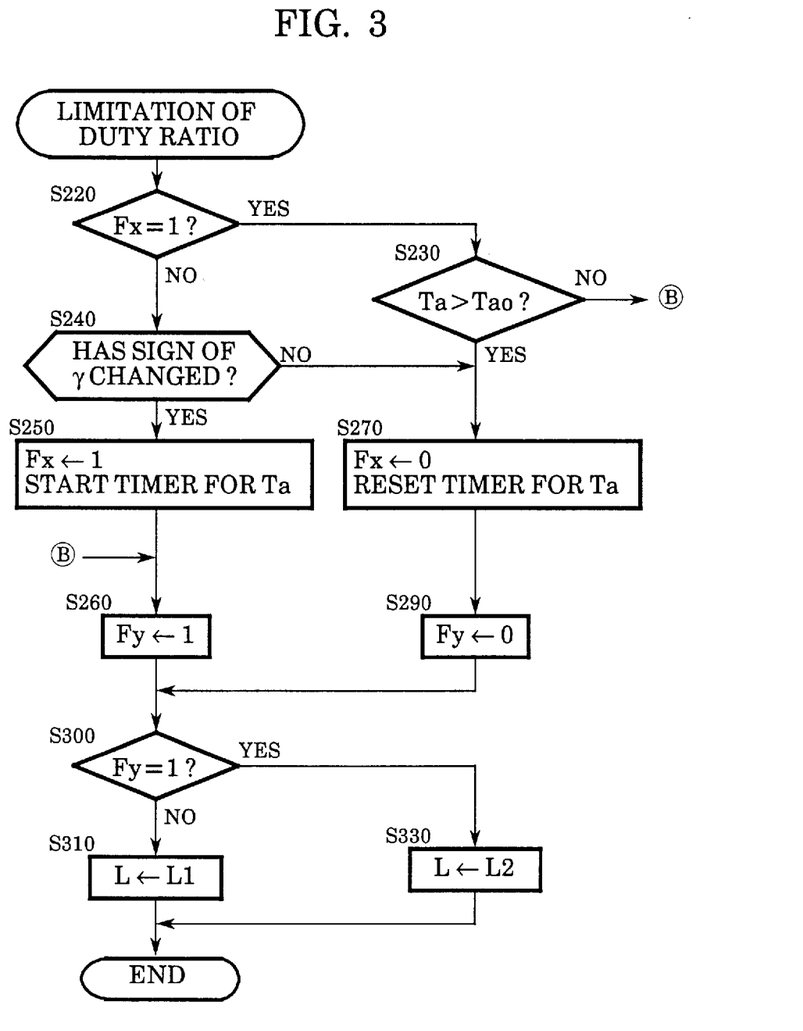
FIG. 3 is a flowchart showing a first embodiment of the routine for limiting the duty ratio for controlling the brake pressure in the routine of FIG. 2.

Referring again to steps 110 and 120, the limitation of the duty ratio Drfo for modifying the increase and decrease gradient of the brake pressure to meet with the degree of emergency of the spin suppress control will be described. FIG. 3 shows a first embodiment for the limitation of the duty ratio Drfo. This routine may be executed appropriately by keeping a timing relation with the execution of the routine of FIG. 2, so as to effect the variable limitation of the duty ratio Drfo in steps 110 and 120 thereof.

In step 220, it is judged if flag Fx is 1. Flag Fx is introduced only for the convenience of discrimination of control pass. Since flag Fx is initially reset to 0, the control proceeds to step 240 until the control once passes through step 250. After the control has once passed through step 250, Fx is set to 1, and thereafter the control proceeds to step 230.

In step 240, it is judged if the sign of the yaw rate γ has changed from that in the previous cycle, and as long as the answer is no, i.e. there occurs no reversal of the yaw rate across the neutral, the control proceeds to step 270, where flag Fx is reset to 0 and a timer for counting time Ta described hereinbelow is also reset. Of course, when they are not yet activated from the initial reset condition, the resetting is a confirmation of the reset condition. Then in step 290, flag Fy, also for the convenience of control, is set to 0. Then the control proceeds to step 300.

In step 300, it is judged if flag Fy is 1. When the control comes from step 290, the answer is no, then the control proceeds to step 310, and the limit value L for use in steps 110 and 120 of FIG. 2 is set to the value of L1. The value of L1 is determined to be a relatively low value such as, for example, about 20%. Therefore, as long as there occurs no reversal of the yaw rate across the neutral, the spin suppress control, when carried out, is executed at a relatively low duty ratio, so that the brake pressure is moderately increased and decreased according to the above-mentioned spin quantity SQ.

When a reversal of the yaw rate across the neutral has occurred, it is detected in step 240, and thereby the control proceeds to step 250, where flag Fx is set to 1 and the timer for counting time Ta is started, and then in step 260, flag Fy is set to 1. Then, in step 300 the answer becomes yes, and the control proceeds to step 330, where the limiting value L is set to the value of L2. The value of L2 is determined to be a relatively high value such as, for example, about 90%. Therefore, when there occurred a reversal of the yaw rate across the neutral, the spin suppress control is executed at a relatively high duty ratio, so as to quickly increase the brake pressure according to the above-mentioned spin quantity SQ. By this arrangement, taking a reversal of the yaw rate as a parameter for distinguishing the degree of emergency of the spin suppress control, the spin suppress control device can operate at high responsiveness when actually required, without picking up undesirable noises such as an error in the estimation of the slip angle β of the vehicle body, etc. in the normal running condition.

The spin suppress control by the limitation L2 will generally be executed to follow the spin suppress control by L1. When the limitation value was changed over from L1 to L2, the time duration of the control by L2 is counted. That is, after the control has once passed through step 250, the control diverts from step 220 to step 230, and it is judged if a predetermined time Tao has lapsed. Until the time Tao lapses, the control proceeds to step 260, and the spin suppress control is continued by allowing the duty ratio Drfo to be as high as up to L2, and when the time Tao has lapsed, the spin suppress control is returned to the control by the moderate duty ratio.

Figure 7:
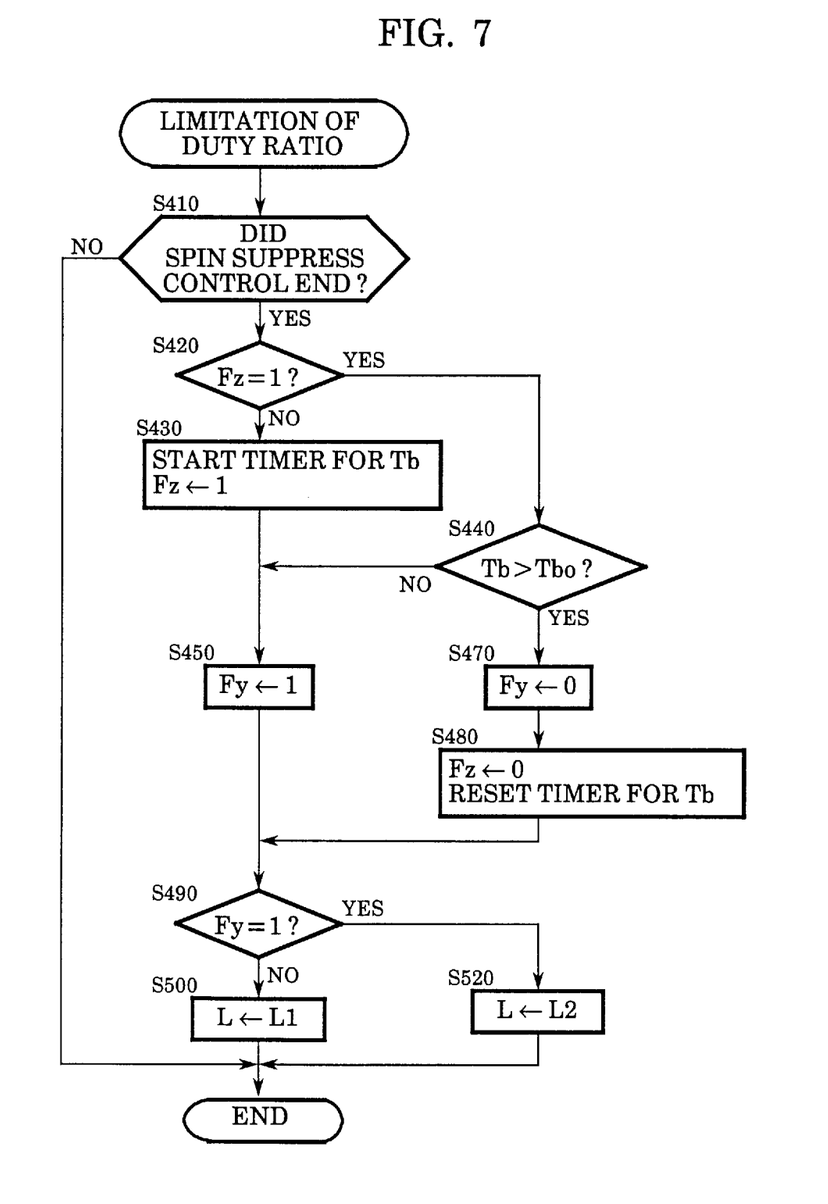
FIG. 7 is a flowchart showing a second embodiment of the routine for limiting the duty ratio for controlling the brake pressure in the routine of FIG. 2.

FIG. 7 shows a second embodiment of the routine for the limitation of the duty ratio Drfo. This embodiment takes the fact that the spin suppress control is restarted after the end of a one time spin suppress control before a predetermined time lapses as a phenomenon indicating a high emergency of the spin suppress control. The routine of FIG. 7 is started every time when a one time spin suppress control by the routine of FIG. 2 ends, so as to provide the limit values L prepared to be either L1 or L2 for use in steps 110 and 120 of the routine of FIG. 2.

In step 410, it is judged if the spin suppress control ended. If the answer is yes, the control proceeds to step 420, whereas if the answer is no, the control is ended. In step 420, it is judged if flag Fz for the convenience of control is 1. Since flag Fz is initially reset to 0, the first control pass proceeds to step 430, while the second and subsequent control pass proceed to step 440. In step 430, a timer for time count Tb is started, and flag Fz is set to 1. Then the control proceeds to step 450.

In step 440, it is judged if the time count Tb has counted a time Tbo, and if the answer is no, the control proceeds to step 450, whereas if the answer is yes, the control proceeds to step 470.

In step 450, flag Fy is set to 1. In step 470, flag Fy is reset to 0, and then in step 480, flag Fz is reset to 0, and the timer for the time count Tb is also reset.

In step 490, it is judged if flag Fy=1. When Fy is 0, in step 500 the limit value for limiting the duty ratio Drfo in steps 110 and 120 of FIG. 2 is set to L1, while when Fz is 1, in step 520 the limit value L is set to L2. The values of L1 and L2 may be appropriately determined such that, when the vehicle is in such a turnful operating condition that after the end of a one time spin suppress control, the next spin suppress control is soon restarted before a predetermined time lapses, the responsiveness of the spin suppress control is made high by the duty ratio Drfo being allowed to increase up to a relatively high limit value L2, while, when the vehicle is not in such a turnful operating condition, the responsiveness of the spin suppress control is made low enough not to pick up undesirable noises by the duty ratio Drfo being limited by a relatively low limit value L1.

Figure 8:
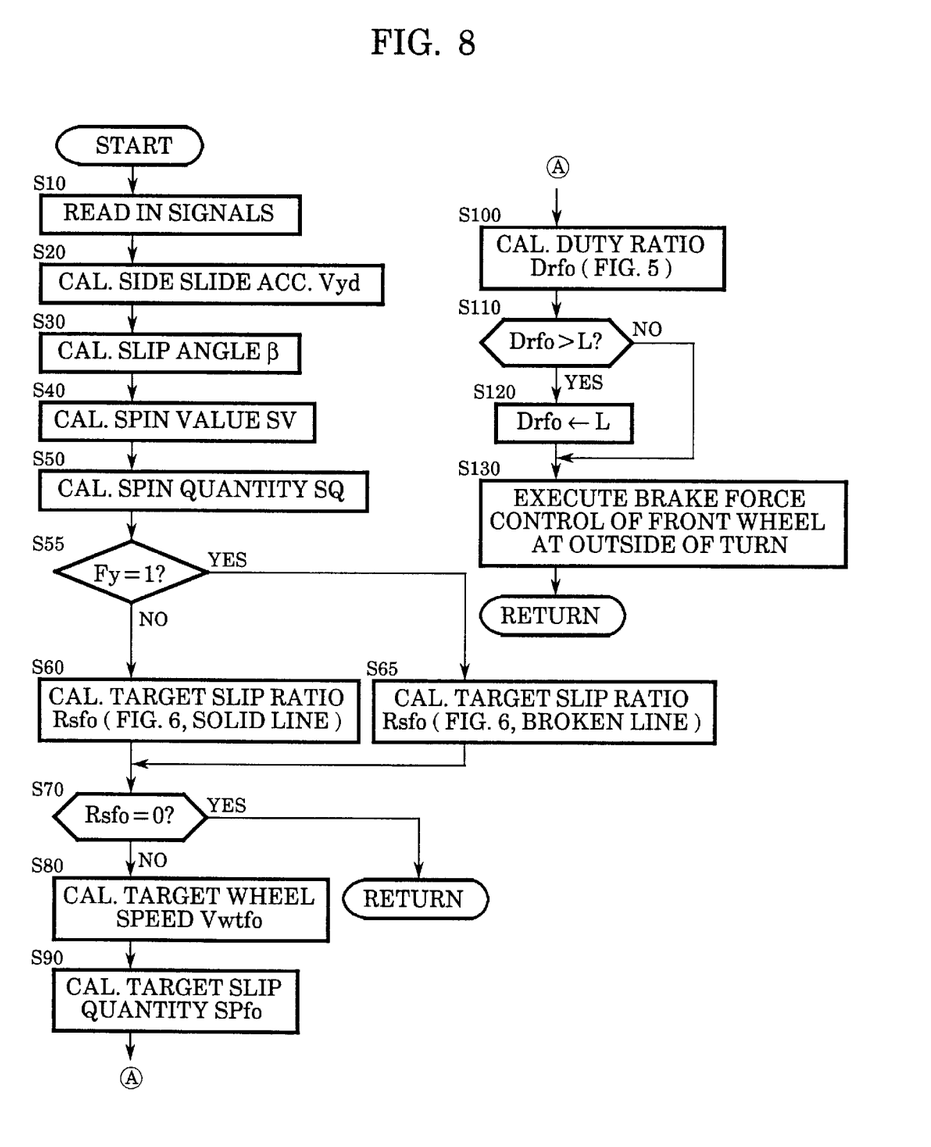
FIG. 8 is a flowchart showing a modification of the embodiment shown in FIG. 2.

FIG. 8 is a flowchart showing a modification of the spin suppress control according to the flowchart of FIG. 2. In FIG. 8, the steps corresponding to those shown in FIG. 2 are designated by the same step numbers as in FIG. 2.

Figure 6:
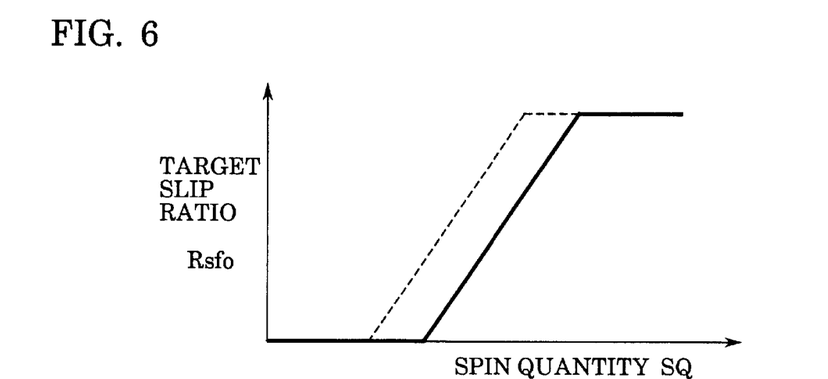
FIG. 6 is a graph showing the relationship between the spin quantity SQ and the target slip ratio Rsfo.

In this modification, in step 55, it is judged if flag Fy in the routine of FIG. 3 or 7 is 1, and when the answer is no, then in step 60 a target slip ratio Rsfo for the front wheel at the outside of the turn is calculated according to a map such as shown by the solid line in FIG. 6, whereas when the answer is yes, the target slip ratio Rsfo is calculated in step 65 according to a map such as shown by the broken line in FIG. 6.

Thus, according to this modification, when the emergency of the spin control is low (Fy=0), the target slip ratio Rsfo is calculated in step 60 to be relatively low against the spin quantity SQ, so as not to execute an unnecessary spin suppress control as induced by a noise such as an error in the detection or estimation of the slip angle β of the vehicle body, etc.

On the other hand, when the emergency of the spin suppress control is high (Fy=1), the target slip ratio Rsfo is calculated in step 65 to be relatively high against the spin quantity SQ, so as to execute the spin suppress control at high responsiveness.

Figure 9:
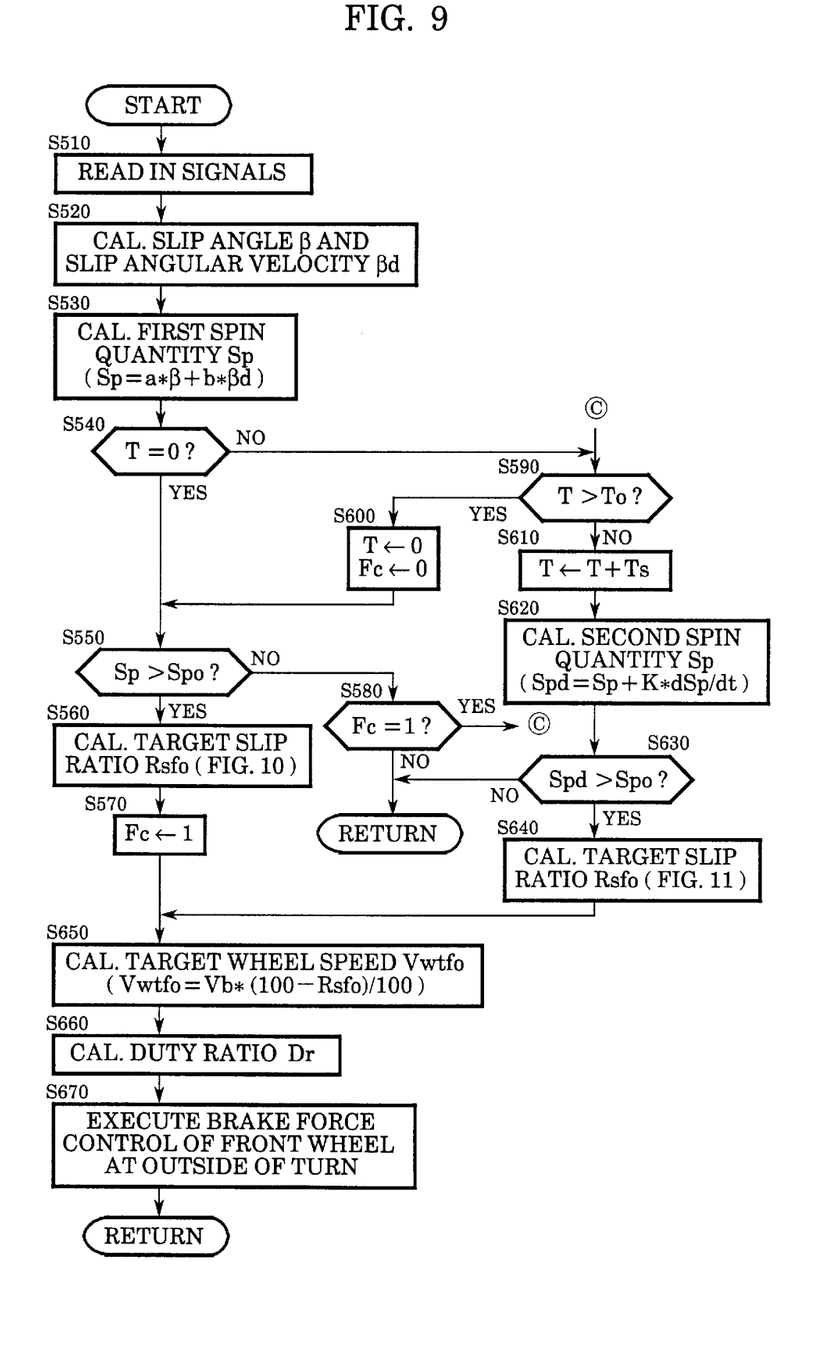
FIG. 9 is a flowchart showing a second embodiment of the spin suppress control routine according to the present invention.

FIG. 9 shows a second embodiment of the spin suppress control routine by the present invention. The control according to this flowchart is also started by a closure of an ignition switch not shown in the figure and carried out repetitively at a predetermined time interval, like the flowchart shown in FIG. 2.

First, in step 510, the signals including the vehicle speed V from the vehicle speed sensor 76 and others are read in, and then in step 520 the slip angle β of the vehicle body is calculated in the same manner as in steps 20 and 30 in the first embodiment, and further slip angular velocity β d is calculated as a differential of the slip angle β. In step 530, denoting a and b as positive constants, a first spin quantity Sp is calculated as follows:

$$Sp = a*\beta + b*\beta \, d$$

It is to be noted that, although Sp is simply expressed as $a*\beta + b*\beta \, d$ for the purpose of simplicity of the description, the first spin quantity Sp is the value processed in the same manner as in steps 40 and 50 of FIG. 2 based upon the absolute value of a*β+b*β d so that it always shows a positive value or zero regardless of the turn direction of the vehicle.

In step 540, it is judged if a count value T by a timer is 0. As will be seen hereinbelow, T is a time count for a predetermined period To after the end of the spin suppress control based upon the first spin quantity Sp. Since T is initially reset to 0, the control first proceeds to step 550. In step 550, it is judged if the first spin quantity Sp is greater than a threshold value Spo, and if the answer is yes, the control proceeds to step 560, whereas if the answer is no, the control proceeds to step 580. When the control proceeds to step 580 before step 570 has been passed, since flag Fc for the convenience of control is initially reset to 0, the control is returned to step 510, i.e. no spin suppress control is carried out.

Figure 10:
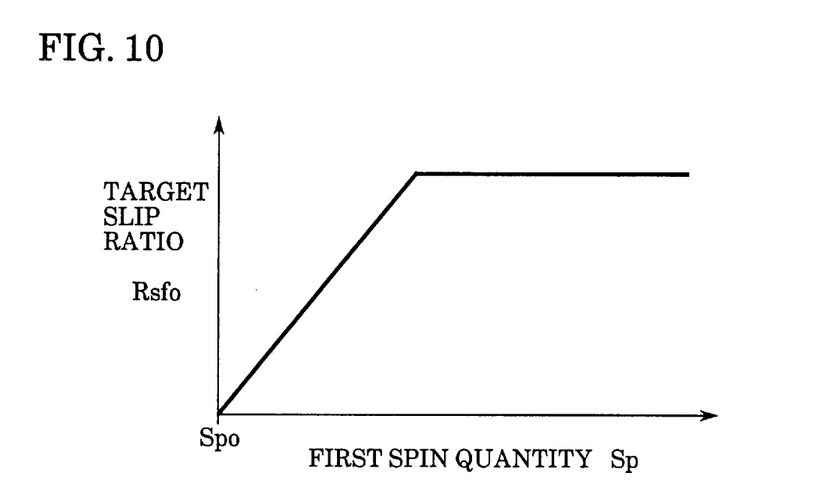
FIG. 10 is a graph showing the relationship between the first spin quantity Sp and the target slip ratio Rsfo.

In step 560, a target slip ratio Rsfo for the front wheel at the outside of the turn is calculated according to a map such as shown in FIG. 10 based upon the first spin quantity Sp, and then in step 570 flag Fc is set to 1.

In step 650, a target wheel speed Vwtfo for the front wheel at the outside of the turn is calculated, in the same manner as in step 80 of FIG. 2, as follows:

$$Vwtfo=Vb*(100-Rsfo)/100$$

Then in step 660, denoting Kp and Kd as proportional constants for proportional and differential terms in a feedback control of wheel speed, the duty ratio for the feedback control is calculated as follows:

$$Dr=Kp*(Vwfo-Vwtfo)+Kd*d(Vwfo-Vwtfo)/dt$$

In step 670, control signals are output toward the control valve 50FL or 50FR corresponding to the front wheel at the outside of the turn, so that the control valve 50FL or 50FR is changed over to the second positions thereof, and also toward the on-off valves 54FL and 56FL or 54FR and 56FR of the front wheel at the outside of the turn, so that the powered brake pressure is supplied to the wheel cylinder 48FL or 48FR of the front wheel at the outside of the turn according to the duty ratio Dr.

The spin suppress control based upon the first spin quantity Sp is thus continued, whereby the first spin quantity will decrease to become soon less than the threshold value Spo. Such a situation will be more readily understood by referring to FIG. 12, wherein it is assumed that the steering angle θ was increased anti-clockwise starting at time point t1, whereby the slip angle β started to increase at time point t2, and in accordance therewith the spin quantity Sp also started to increase as shown in the figure, such that at time point t3 it is detected that the spin quantity Sp exceeded the threshold value Spo. However, by the spin suppress control being executed through steps 560-650-660-670 while the steering angle being returned toward the neutral, the slip angle β as well as the slip quantity Sp turn toward the neutral, and at time point t4, the answer of step 550 changes to no. In the meantime, from time point t3 to time point t4, the front right wheel, i.e. the front wheel at the outside of the turn, was applied a spin control braking force, as reflected on by the behavior of the target slip ratio Rsfo.

When the control proceeds from step 550 to step 580, since Fc is already 1, the control reaches step 590. Thereafter, time is counted by steps 590 and 610 with an increment Ts, and now in step 620, denoting K as a positive constant, a second spin quantity Spd is calculated as follows:

$$Spd=Sp+K*dSp/dt$$

Figure 11:
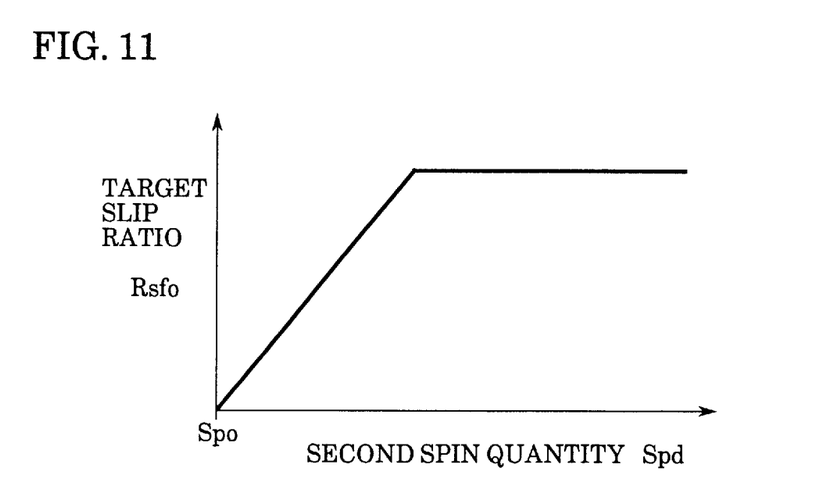
FIG. 11 is a graph showing the relationship between the second spin quantity Spd and the target slip ratio Rsfo.
Figure 12:
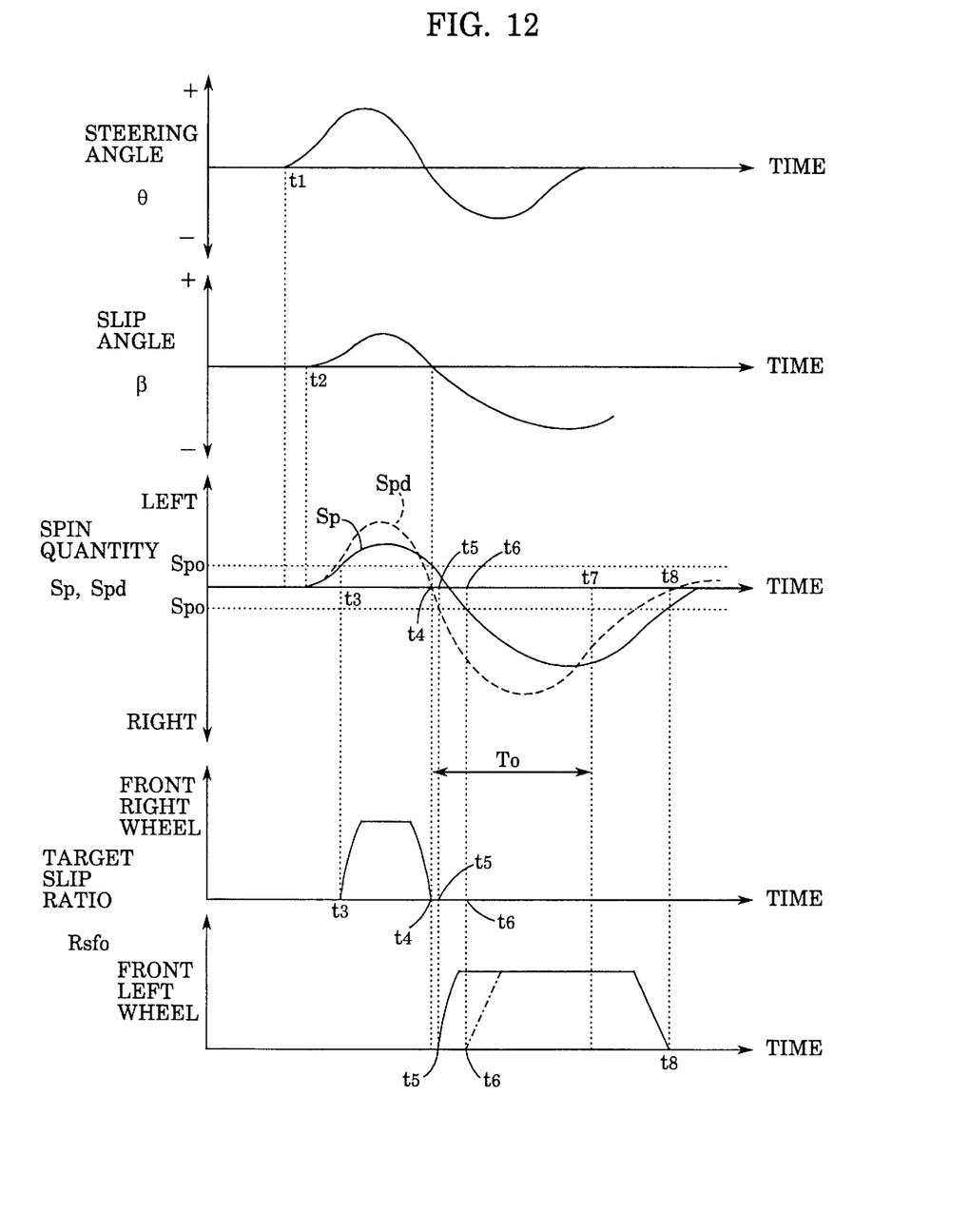
FIG. 12 is a graph showing an example of the change of the steering angle θ and other related parameters when the vehicle is steered leftward and then continually reversed rightward beyond the neutral.

It is the same with the second spin quantity Spd that it is processed according to the definition of the spin quantity as noted in step 530. By the addition of the differential term K*dSp/dt, the second spin quantity Spd shows a more steeply changing behavior than the first spin quantity Sp as shown in FIG. 12. Then in step 630 it is now judged if the second spin quantity Spd is greater than the threshold value Spo. If the answer is yes, the control proceeds to step 640, and the target slip ratio Rsfo is calculated from a map such as shown in FIG. 11 based upon the second spin quantity Spd. Then the control proceeds to step 650 to execute the spin suppress braking.

Thus, when the steering angle θ is changed such as continually reversed as shown in FIG. 12, a higher emergency of the need of the next spin suppress control is detected at a higher sensitiveness, by checking if the second spin quantity Spd exceeds a predetermined threshold value, as will be appreciated by that the second spin quantity Spd traverses the threshold value Spo at time point t5 earlier than the first spin quantity Sp traversing the threshold value Spo only at time point t6. Such a sensitiveness augmented spin state detection is ensured for the time duration To counted by the time count steps 590 and 610.

In fact, as will be appreciated from FIG. 12, in such an occasion that the steering wheel was once turned in one direction and then continually reversed in the opposite direction beyond the neutral, even the first spin quantity Sp also traverses the threshold value Spo out at time point t6, early enough before the time duration To is counted up, although it is substantially delayed as compared with the second spin quantity Spd, and therefore, by the time when the control proceeds from step 590 to step 550 through step 600, with resetting of the time counter, the required spin suppress control is continued as supported by the positive answer of step 550, until it is finally ended at time point t8. In the meantime, from time point t5 to time point t8 the spin suppress control is executed so as to apply a spin suppress braking to the front left wheel, as reflected on by the second heave of the target slip ratio Rsfo extending from time point t5 to time point t8. In this connection, the phantom line extending from time point t6 shows how the spin suppress control would be delayed if it is dependent only on the first spin quantity Sp.

According to this embodiment, since the highly sensitive spin suppress control required for an emergency, is carried out only in a short period after the completion of the normal behavior control, as ensured by the second spin quantity incorporating the time-based differential of the spin quantity in addition to the spin quantity for the ordinary spin suppress control, it is avoided that an unnecessary spin suppress control is carried out during the ordinary vehicle running condition due to a noise such as an error included in the detected or estimated values of the lateral acceleration Gy, yaw rate γ, etc.

Although in the above-mentioned second embodiment the first spin quantity Sp is calculated as a linear sum of the slip angle β and the slip angular velocity β d of the vehicle body, and the second spin quantity Spd is calculated as a sum of the first spin quantity and a product of the differential dSp/dt of the first spin quantity and a proportional constant K, the first spin quantity may be calculated in any appropriate manner as long as it is based upon a parameter expressing the spin state of the vehicle, and the second spin quantity may also be calculated in any optional manner as long as it includes a differential of the first spin quantity.

Further, although in the above-mentioned second embodiment, the factor K for calculating the second spin quantity Spd is a positive constant, this factor may be varied to be gradually smaller according to the lapse of time T, or the factor K may be variably set to be greater as the magnitude of the steering angular velocity at the time point at which the first spin quantity Sp decreases below the threshold value Spo is higher.

Further, in the above-mentioned second embodiment, the time duration To may be varied to be longer as the absolute value of the steering angular velocity at the time point at which the first spin quantity Sp decreases below the threshold value Spo is larger.

Further, although in the above-mentioned second embodiment, the threshold value Spo for the judgment in steps 550 and 630 is the same, the threshold value for the judgment in step 630 may be different from that in step 550. Further, although the process returns to step 510 when the answer of step 630 is no, the control may proceed to step 600 when the answer of step 630 is no, so that, when the spin state has disappeared before the lapse of the time duration To, the control is resumed to the normal behavior control based upon the first spin quantity.

Further, although in the above-mentioned embodiments, the braking force of the front wheel at the outside of the turn is controlled according to a feedback of the wheel speed, the braking force of the front wheel at the outside of the turn may be controlled according to a feedback of pressure based upon the pressure in the wheel cylinder.

Further, although in the above-mentioned embodiments, the braking force is applied only to the front wheel at the outside of the turn, a braking force may also be applied to the front wheel at the inside of the turn, so that a spin suppress moment is applied to the vehicle by the balance between the braking forces applied to the front wheels at the outside and the inside of the turn. Further, the rear wheels may be appropriately braked for the spin suppress control.

Although the present invention has been described with respect to some particular embodiments thereof, it will be apparent for those skilled in the art that various modifications are possible with respect to the shown embodiments within the scope of the present invention.

We claim:

1. A spin suppress control device of a vehicle having a vehicle body, front left and right wheels, and a steering means for steering the front left and right wheels for a turn of the vehicle, comprising a means for making a first time spin state estimation of the vehicle body indicating a need of a spin suppress control and a second time spin state estimation of the vehicle body indicating a need of a spin suppress control in succession to said first time spin state estimation, a brake means for applying a variable braking force to each of the front left and right wheels, and a means for controlling said brake means to apply a braking force to one of the front left and right wheels at the outside of the turn, wherein said brake control means controls said brake means so as to apply a first time braking force to the front wheel at the outside of the turn with a first limit of speed of application according to said first time spin state estimation and a second time braking force to the front wheel at the outside of the turn with a second limit of speed of application according to said second time spin state estimation, said second limit of speed of application being made greater than said first limit of speed of application when said second time spin state estimation occurs within a predetermined proximity of said first time spin state estimation.

2. A spin suppress control device according to claim 1, wherein said second time spin state estimation occurred by a continuous reversal of yaw rate of the vehicle body across neutral thereof is deemed to be within said predetermined proximity.

3. A spin suppress control device according to claim 1, wherein said second time spin state estimation occurred above a predetermined level before a predetermined time lapses from the end of the spin suppress control according to said first time spin state estimation is deemed to be within said predetermined proximity.

4. A spin suppress control device according to claim 3, wherein said predetermined level is made lower before said predetermined time lapses than after said predetermined time has lapsed, said predetermined level being a threshold value of a parameter for said means for making said first and second time spin state estimations of the vehicle body to make a spin state estimation indicating a need of a spin suppress control by exceeding said threshold value.

5. A spin suppress control device according to claim 1, wherein said brake means includes a wheel cylinder, an inlet valve, an outlet valve, and a hydraulic system for supplying brake fluid to said wheel cylinder through said inlet valve and exhausting the brake fluid from said wheel cylinder through said outlet valve, and said second time braking force is applied at a greater speed of application than said first time braking force by duty ratio for opening said inlet valve while closing said outlet valve to closing said inlet valve while opening said outlet valve is limited by a higher limit value for said second time braking force than for said first time breaking force.

* * * * *